(Model.)
J. R. HOOD.
HOE, RAKE AND OTHER AGRICULTURAL IMPLEMENTS.
No. 266,368. Patented Oct. 24, 1882.
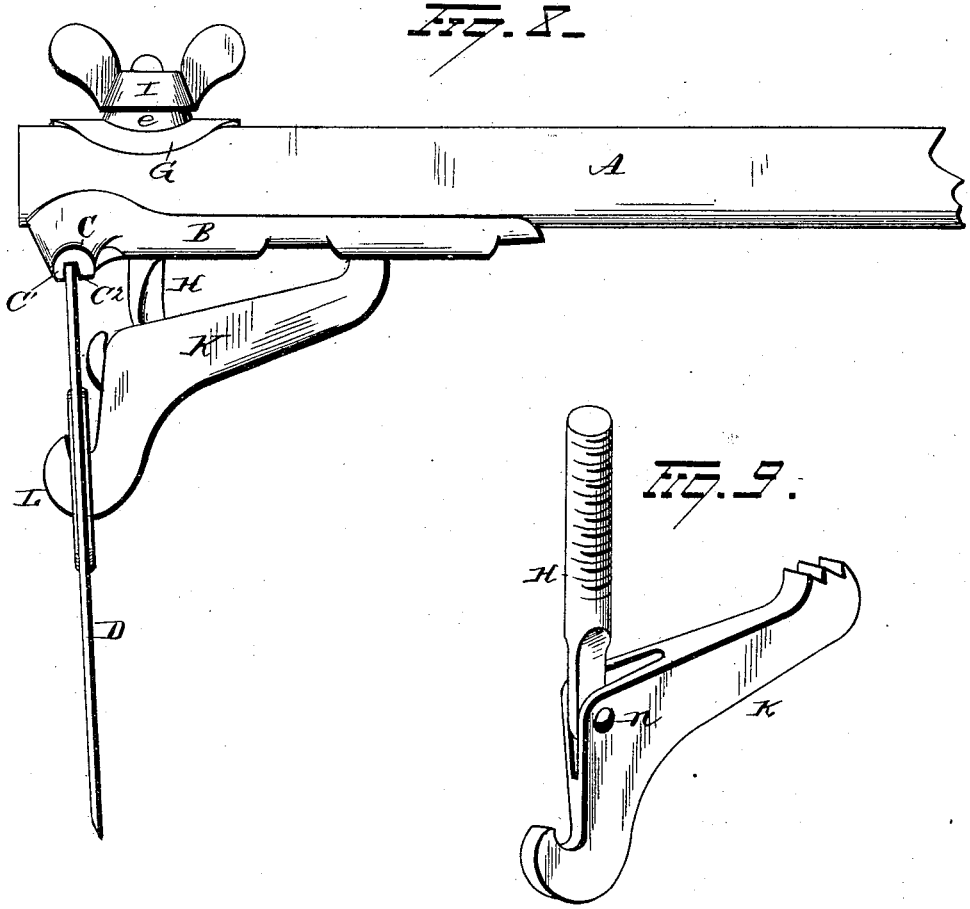

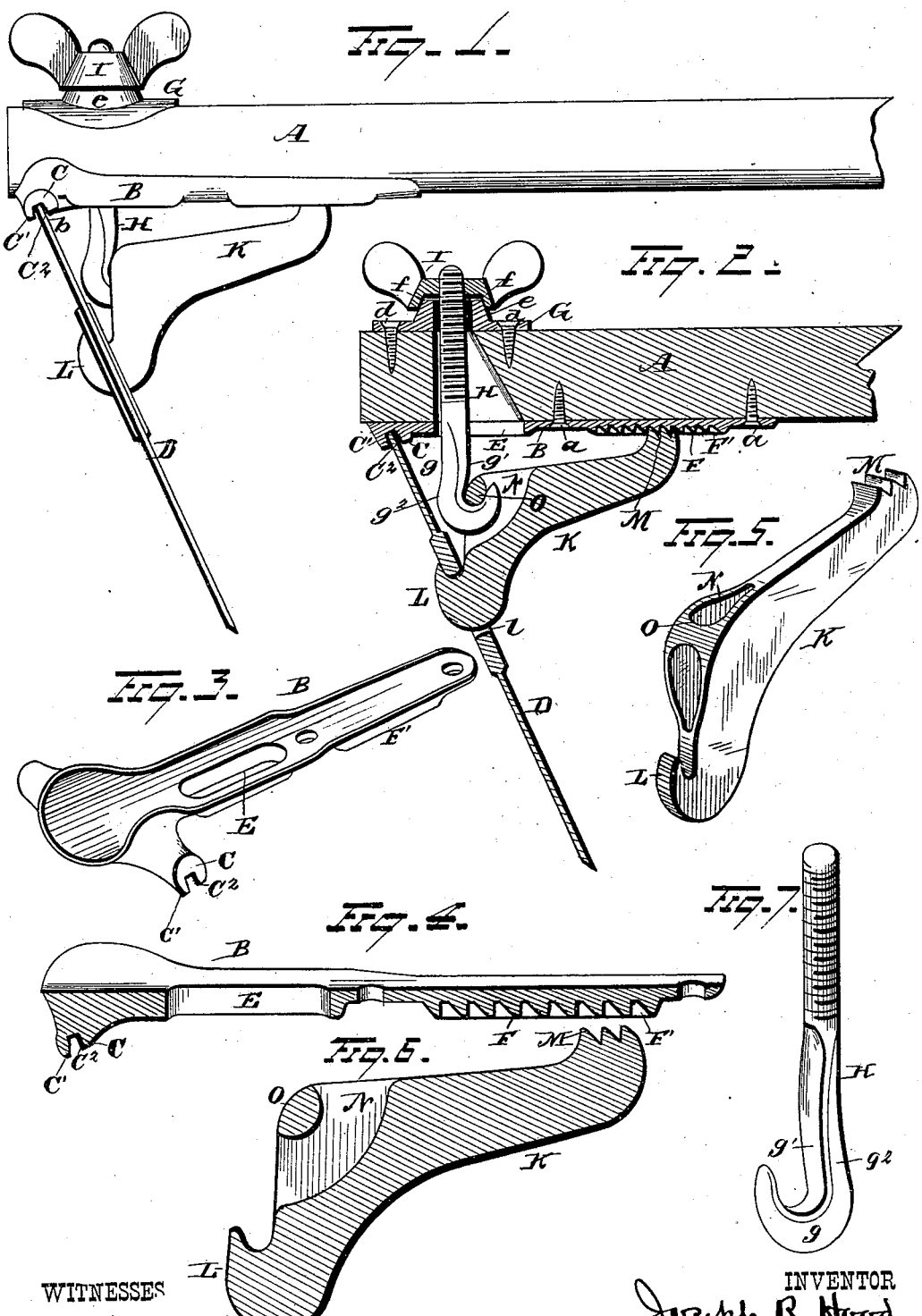

UNITED STATES PATENT OFFICE.

JOSEPH R. HOOD, OF PHILADELPHIA, PENNSYLVANIA.

HOE, RAKE, AND OTHER AGRICULTURAL IMPLEMENTS.

SPECIFICATION forming part of Letters Patent No. 266,368, dated October 24, 1882.

Application filed December 21, 1881. (Model.)

*To all whom it may concern:*

Be it known that I, JOSEPH R. HOOD, of Philadelphia, in the county of Philadelphia and State of Pennsylvania, have invented certain new and useful Improvements in Hoes, Rakes, and other Agricultural Implements; and I do hereby declare the following to be a full, clear, and exact description of the invention, such as will enable others skilled in the art to which it pertains to make and use the same.

My invention relates to an improvement in hoes, rakes, and other agricultural implements.

Heretofore hoe-blades have been adjustably secured to the hoe-handle by means of a hook passing transversely through an arm secured at one end to the blade, and at its other end to a notched or perforated plate attached to the handle. This construction proved objectionable, owing to the fact that the blade was not sufficiently braced against lateral strain.

The object of my invention is to provide an attachment for securing blades to their handles which shall be constructed and arranged to insure a strong and durable brace and prevent any lateral displacement of the blade.

A further object of my invention is to provide efficient devices for retaining the blade in any desired angular adjustment.

With these ends in view my invention consists, first, in the combination, with the handle and blade of a hoe or other implement, of an arm connected at its opposite ends with the blade and handle, and a bolt or hook adjustably secured to the handle and secured to said arm, so as to constitute a lateral brace therefor.

My invention further consists in the combination, with the bolt or hook, of the arm provided with a transverse bearing at its elbow, and an elongated opening extending beneath said bearing for the insertion of the hooked end of the bolt.

My invention further consists in certain features of construction for securing the blade to the handle-plate, as will hereinafter be described, and pointed out in the claims.

My invention further consists in certain other details of construction and combinations of parts, as will hereinafter be described, and pointed out in the claims.

In the accompanying drawings, Figure 1 is a view in side elevation of a hoe constructed according to my invention. Fig. 2 is a longitudinal section. Fig. 3 is a view in perspective of the handle plate or bar. Fig. 4 is an enlarged longitudinal section of the handle plate or bar. Fig. 5 is a detached view, in perspective, of the attaching-arm. Fig. 6 is a longitudinal section of the same. Fig. 7 is a view in perspective of the hook-bolt. Fig. 8 is a side elevation, showing a different adjustment of the hook-bolt; and Fig. 9 is a modification.

A represents a handle, to the under side of which is secured a plate or bar, B, by means of the screws $a$, or it may be fastened in any other desired manner. The forward end of the plate B is provided with two depending flanges, C C', arranged transversely to the length of the bar. Both of these flanges are rearwardly inclined, so as to form a groove, $C^2$, the walls of which are rearwardly inclined. Within the groove $C^2$ is received the upper straight edge, $b$, of the blade D. The form or shape of the inner walls of the groove $C^2$ is important, in that by constructing the walls at a rearward inclination, as shown, the blade is prevented against displacement in its different angles of inclination. An elongated slot or opening, E, is formed in the bar for the insertion of the hook-bolt, and to allow the latter to be moved back and forth according to the desired adjustment of the blade. The rear portion of the bar is provided with ratchet-teeth F, having side flanges or keepers, F'. The teeth F are rearwardly inclined, as shown in the drawings, for a purpose hereinafter described. To the upper side of the handle is secured a clip-plate, G, by screws $d\ d$. This plate has a convex boss, $e$, cast thereon, or if the plate is made of sheet or plate metal the convex boss may be struck up therefrom.

H is the hook-bolt, having its upper end or shank portion screw-threaded for the attachment of the thumb-nut I, the latter having a concave under surface, $f$, that fits the concave boss $e$ on the clip-plate, thereby allowing the lower end of the hook-bolt to be moved forward or backward according to the desired adjustments of the blade, and under all such varied adjustment insure a firm and equal bearing of the nut on its boss. The opposite sides of the hook portion $g$ of the bolt are provided with ribs $g'$, while its rear portion is constructed of a tapering web, $g^2$. This construction of hook insures the desired strength and lightness.

K is an angle-arm, the short arm $k$ thereof having a hook, L, formed thereon which engages in the elongated slot $l$ formed in the blade D. The hooked end of this arm is of such form and width as to practically close the elongated slot or opening $l$ under all the varied adjustments of the blade. The opposite end of the angle-arm is provided with any desired number of ratchet-teeth M, which are forwardly inclined, as illustrated in the drawings. The arm K is constructed with the longitudinal opening N at its elbow, said opening being made tapering from its bottom outward. A transverse bearing, O, is formed at the elbow of the arm.

Having described the different parts of my improvement, I will now briefly describe its mode of operation.

To adjust the blade the thumb-nut I is loosened until the ratchet-teeth on the angle-arm are disengaged from the teeth on the bar. The blade is then adjusted to the desired angle of inclination and the ratchet-teeth of the arm placed in engagement with the ratchet-teeth on the bar or plate attached to the handle. The thumb-nut is then tightened and serves to draw the upper edge of the hoe-blade snugly into the rearwardly-inclined groove, while the forwardly-inclined teeth on the angle-arm are drawn into snug engagement with the rearwardly-inclined ratchet-teeth on the bar or plate attached to the handle. When thus secured the blade is prevented against displacement, as the greater the strain on the blade the more firm will be the gripping action of the ratchet-teeth. The blade is not only braced against longitudinal displacement, but also against any lateral or transverse displacement, as the hook-bolt snugly fits within the lengthwise opening in the angle-arm, and thus serves to prevent the blade from twisting out of place.

In Fig. 8 I have shown the hook-bolt turned around and secured to the angle-arm, so as to give the greatest possible angle to the blade.

In Fig. 9 I have represented a modified construction. The lower end of the hook-bolt is flattened and secured between the ears of the angle-arm by means of a rivet, $n$. Instead of employing a hook-bolt of the peculiar form shown, I may use a bolt that is round, square, or flattened in cross-section.

It is evident that many slight changes in the form and construction of parts might be resorted to without departing from the spirit of my invention, and hence I do not limit myself to the exact construction and arrangement of parts shown and described.

Having fully described my invention, what I claim as new, and desire to secure by Letters Patent, is—

1. The combination, with an arm removably connected at its opposite ends with the blade and handle, of a fastening-bolt constructed substantially as shown, and adjustably connected with the handle and movably attached to said arm, and adapted to form two lateral bearings for the arm, and thereby prevent its lateral displacement in either direction, as set forth.

2. The combination, with an arm removably connected with the blade and handle, said arm being provided with a transverse bearing-piece and a longitudinal opening beneath the same, of a hook-bolt constructed to be adjustably secured to the handle and to be hooked to the arm and serve as a lateral brace therefor, substantially as set forth.

3. The combination, with the blade and handle, of an arm, K, removably secured to the handle and blade, and a hook-bolt arranged with its hook in line with the arm, substantially as set forth.

4. The combination, with the arm provided with forwardly-inclined ratchet-teeth, of the bar or plate provided with rearwardly-inclined teeth, substantially as set forth.

5. The combination, with the arm provided with forwardly-inclined teeth, of the bar or plate provided with rearwardly-inclined teeth, and keepers or flanges on the sides of the teeth, substantially as set forth.

6. The combination, with the arm having the longitudinal opening formed tapering in cross-section, of the hook-bolt made tapering in cross-section, substantially as set forth.

7. The combination, with the blade and handle, of an arm adapted to be removably secured to the handle, and a hook-bolt adapted to be attached to the arm, with its hook portion in line therewith or parallel thereto, and to be secured in reverse positions for varying the inclination of the blade, substantially as set forth.

In testimony whereof I have signed this specification in the presence of two subscribing witnesses.

JOSEPH R. HOOD.

Witnesses:
  HERMAN MORAN,
  CHARLES P. WEBSTER.